United States Patent
Fitch

(10) Patent No.: US 11,144,924 B2
(45) Date of Patent: Oct. 12, 2021

(54) FACILITATING PEER-TO-PEER TRANSACTIONS USING VIRTUAL DEBIT ACCOUNTS OF VIRTUAL WALLETS

(71) Applicant: MasterCard International Incorporated, Purchase, NY (US)

(72) Inventor: Jennifer Fitch, Lindsay (CA)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 763 days.

(21) Appl. No.: 15/842,809

(22) Filed: Dec. 14, 2017

(65) Prior Publication Data

US 2019/0188724 A1  Jun. 20, 2019

(51) Int. Cl.
*G06Q 20/40* (2012.01)
*G06Q 20/10* (2012.01)
(Continued)

(52) U.S. Cl.
CPC ....... *G06Q 20/40145* (2013.01); *G06Q 20/10* (2013.01); *G06Q 20/26* (2013.01);
(Continued)

(58) Field of Classification Search
CPC ............. G06Q 20/3278; G06Q 20/322; G06Q 20/3223; G06Q 20/10; G06Q 20/26; G06Q 20/36
See application file for complete search history.

(56) References Cited

U.S. PATENT DOCUMENTS 5,883,810 A  3/1999  Franklin et al.
7,349,871 B2  3/2008  Labrou et al.
(Continued)

FOREIGN PATENT DOCUMENTS

WO  2004049621  6/2004
WO  2008005018  1/2008

OTHER PUBLICATIONS

Unknown, "Bravo App", Bravo, LLC, https://trybravo.com/, 2017, Captured Nov. 25, 2017, 5 pages.
(Continued)

*Primary Examiner* — Scott S Trotter

(57) ABSTRACT

The disclosure facilitates transactions between virtual debit accounts associated with corresponding transaction applications. A transaction initiation request including a transaction amount is received by a sender transaction application on a sender computing device. A recipient transaction application is detected within a proximity of the sender computing device by the sender transaction application. A virtual debit account associated with a virtual wallet of the sender transaction application is accessed and a transfer of the transaction amount is initiated from the accessed virtual debit account to a corresponding virtual debit account associated with the recipient transaction application. Upon a confirmation of the transfer being received from the recipient transaction application, a record of the transfer is provided to an issuer of the accessed virtual debit account. The use of the compatible transaction applications and associated virtual debit accounts provides fast, secure transaction capabilities between parties that may be unfamiliar with each other.

20 Claims, 6 Drawing Sheets

(51) Int. Cl.
  *G06Q 20/36* (2012.01)
  *G06Q 20/26* (2012.01)
  *G06Q 20/32* (2012.01)

(52) U.S. Cl.
  CPC ......... *G06Q 20/36* (2013.01); *G06Q 20/3224* (2013.01); *G06Q 20/3278* (2013.01)

(56) References Cited

U.S. PATENT DOCUMENTS

| | | |
|---|---|---|
| 7,590,547 B2 | 9/2009 | Lagadec et al. |
| 7,873,573 B2 | 1/2011 | Realini |
| 8,380,177 B2 | 2/2013 | Laracey |
| 8,412,626 B2 | 4/2013 | Hirson et al. |
| 8,423,457 B1 | 4/2013 | Schattauer et al. |
| 8,851,372 B2 | 10/2014 | Zhou et al. |
| 8,892,462 B1 | 11/2014 | Borovsky et al. |
| 9,406,011 B2 | 8/2016 | Bartenstein et al. |
| 2007/0255653 A1 | 11/2007 | Tumminaro et al. |
| 2008/0052091 A1* | 2/2008 | Vawter ............... G06Q 40/02 705/39 |
| 2009/0024533 A1 | 1/2009 | Fernandes et al. |
| 2009/0070263 A1* | 3/2009 | Davis ............... G06Q 20/322 705/44 |
| 2010/0082481 A1 | 4/2010 | Lin et al. |
| 2010/0223183 A1 | 9/2010 | Smith |
| 2011/0119190 A1 | 5/2011 | Mina |
| 2011/0161232 A1 | 6/2011 | Brown |
| 2011/0264543 A1 | 10/2011 | Taveau et al. |
| 2012/0253913 A1* | 10/2012 | Richard ............... G06Q 20/363 705/14.27 |
| 2012/0322032 A1 | 12/2012 | Smith |
| 2012/0330769 A1 | 12/2012 | Diaz |
| 2013/0018779 A1 | 1/2013 | Laquerre et al. |
| 2013/0159186 A1 | 6/2013 | Brudnicki et al. |
| 2013/0218721 A1 | 8/2013 | Borhan et al. |
| 2013/0238503 A1 | 9/2013 | Patel |
| 2013/0339253 A1 | 12/2013 | Sincai |
| 2014/0279469 A1 | 9/2014 | Mendes |
| 2014/0379584 A1 | 12/2014 | Ward et al. |
| 2015/0302388 A1 | 10/2015 | Seidman et al. |
| 2015/0356547 A1 | 12/2015 | Abed et al. |
| 2015/0356548 A1 | 12/2015 | Luna-Rodriguez et al. |
| 2016/0012465 A1 | 1/2016 | Sharp et al. |
| 2016/0210613 A1* | 7/2016 | McGill ............... H04B 5/0031 |
| 2016/0239840 A1 | 8/2016 | Preibisch |
| 2016/0379201 A1 | 12/2016 | Sabet et al. |
| 2017/0017954 A1 | 1/2017 | Mcdonough et al. |
| 2017/0046679 A1* | 2/2017 | Gotlieb ............... G06Q 20/351 |
| 2017/0064753 A1* | 3/2017 | Zhao ............... H04W 8/24 |
| 2017/0202040 A1 | 7/2017 | Chatterton |
| 2018/0068293 A1* | 3/2018 | Dunne ............... G06Q 20/3223 |

OTHER PUBLICATIONS

Unknown "Global Tipping: The fun and practical tipping app for iPhone", http://www.globaltippingapp.com/, Captured Nov. 25, 2017, 2 pages.
Unknown, "Gratuity: tip calculator App", MrEngineer13, https://play.google.com/store/apps/details?id=com.mrengineer13.gratuity.free&hl=en, Feb. 6, 2017, Captured Nov. 25, 2017, 6 pages.
Unknown, "Gratuu: How it works", Gratuu Ltd., https://www.gratuu.com/about/howitworks, Captured Nov. 25, 2017, 4 pages.
Unknown, "Oppa App" Oppa, Inc., https://itunes.apple.com/ca/app/oppa/id1061280012?mt=8, Feb. 14, 2017, Captured Nov. 25, 2017, 2 pages.
Unknown, "Thanks!: Tipping App", Go Cashless Inc., http://www.usethanks.com/, 2016, Captured Nov. 25, 2017, 2 pages.
Unknown, "TipGenie App" Tip Genie Inc., https://www.tipgenie.io/, 2017, Captured Nov. 25, 2017, 9 pages.
Unknown, "Tipping Circle App", Inovacode Inc., https://tippingcircle.com/, 2017, Captured Nov. 25, 2017, 2 pages.
Unknown, "Tipsta App", Simpalm, http://www.simpalm.com/applications/tipsta-app, 2014, Captured Nov. 25, 2017, 5 pages.
Torres, "Payments", Research to reality white paper, CU Tech, https://www.cutech.com, Feb. 19, 2009, 64 pages.
Youssefzadeh, "Future of Payment Platforms", A Thesis presented to the Faculty of California Polytechnic State University, San Luis Obispo, http://digitalcommons.calpoly.edu/theses/1241/, Jun. 2014, 86 pages.
Mole, "Modeling Smart Mobile Money Wallet and Offline Payment", A Thesis Submitted to the Department of Computer Science, Addis Ababa University, Ethiopia, Feb. 2016, 119 pages.
Van Damme, "Offline NFC Payments with Electronic Vouchers", Proceedings of the 1st ACM Workshop on Networking, Systems, and Applications for Mobile Handhelds, Barcelona, Spain, Aug. 17, 2009, 25-30.
Unknown, "GratZeez", Cloudzon Infoconnect PVT Ltd., https://itunes.apple.com/us/app/gratzeez/id968247999?mt=8, Jul. 16, 2017, 4 pages.
Williams & Julian, "Mobile Wallets: What You Need to Know", The Restaurant Technology Guys, http://restauranttechnologyguys.com/, Oct. 14, 2015, 3 pages.
Singh, "Offline Transactions Functionality in eWallets", Indian Journal of Science and Technology vol. 10(16), Apr. 2017, 4 pages.
Hurwitz, "Off The Grid—Bitcoin and Ethereum Storage", https://medium.com/@AdamHurwitz/off-the-grid-bitcoin-and-ethereum-storage-11e37861a99f, Jul. 19, accessed Oct. 17, 2017, 16 pages.

* cited by examiner

FACILITATING PEER-TO-PEER TRANSACTIONS USING VIRTUAL DEBIT ACCOUNTS OF VIRTUAL WALLETS

BACKGROUND

Electronic payment methods have become more common and, as a result, fewer people are carrying cash. The use of electronic or virtual wallets enables users to transfer funds from credit card accounts or bank accounts associated with the virtual wallets to recipients based on the recipients' profiles or other associated identifying information on the users' computing devices. However, transferring a payment to recipients with whom a user is unfamiliar and/or whose identifying information is unknown to the sending user requires that the sending user first obtain the identifying information from the prospective recipient, input the obtained identifying information to the sending user's computing device, and then transfer the desired payment. Making rapid, user-friendly transfers to prospective recipients who are not already known and identified within the sending user's computing device is a challenge in existing systems due to the steps required to register or identify the recipient. Current electronic payment methods do not enable users to accurately and quickly transfer funds to recipients who are otherwise unknown to the users, such as in tipping transactions from customers to servers at restaurants.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for facilitating a transaction to a recipient computing device is described. A transaction initiation request is received by a sender transaction application on a sender computing device, the transaction initiation request including a transaction amount. A recipient transaction application is detected with in a proximity of the sender computing device by the sender transaction application. A virtual debit account associated with a virtual wallet of the sender transaction application is accessed and a transfer of the transaction amount is initiated from the accessed virtual debit account to a corresponding virtual debit account associated with the detected recipient transaction application via short-range wireless communication. Upon a confirmation of the transfer being received from the recipient transaction application, a record of the transfer is provided to an issuer of the accessed virtual debit account.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

The systems and methods described herein are configured to facilitate peer-to-peer transactions using virtual debit accounts of virtual wallets. A transaction initiation request is received by a sender transaction application on a sender computing device, the transaction initiation request including a transaction amount. A recipient transaction application is detected within a proximity of the sender computing device by the sender transaction application. The sender transaction application is configured to detect computing devices that include transaction applications compatible with the sender transaction application, in some examples. A virtual debit account associated with a virtual wallet of the sender transaction application is accessed, and a transfer of the transaction amount is initiated from the accessed virtual debit account of the sender transaction application to a corresponding virtual debit account associated with the detected recipient transaction application. Upon a confirmation of the transfer being completed successfully, a record of the transfer is provided to an issuer of the accessed virtual debit account of the sender transaction application. The disclosure enables the initiation of a fast, secure transaction between a sender and a recipient without the sender having previous familiarity with the recipient.

The described disclosure improves the user experience of using a transaction application to initiate and/or participate in a peer-to-peer transaction. Because the described virtual debit accounts are separate from a user's other accounts and may be limited to relatively small balance amounts, the user's other accounts, such as credit card accounts, bank accounts, etc. are protected from exposure during the described transactions. Further, the use of compatible transaction applications that are configured to detect one another via short-range network protocols enables senders to identify recipients easily without being previously familiar with the identified recipients (e.g., having the recipients contact information, email addresses, etc.). The process of electronically transferring funds to a recipient is improved in that it is faster and simpler than conventional methods while maintaining security despite the relative anonymity of the senders and/or recipients to each other. For instance, these combined features provide a user-friendly alternative to tipping a server with cash or other similar cash-based transactions. As such, the disclosure describes an unconventional technological solution to technological limitations of electronic peer-to-peer transactions that improves the user experience and function of the computing device.

Figure 1:
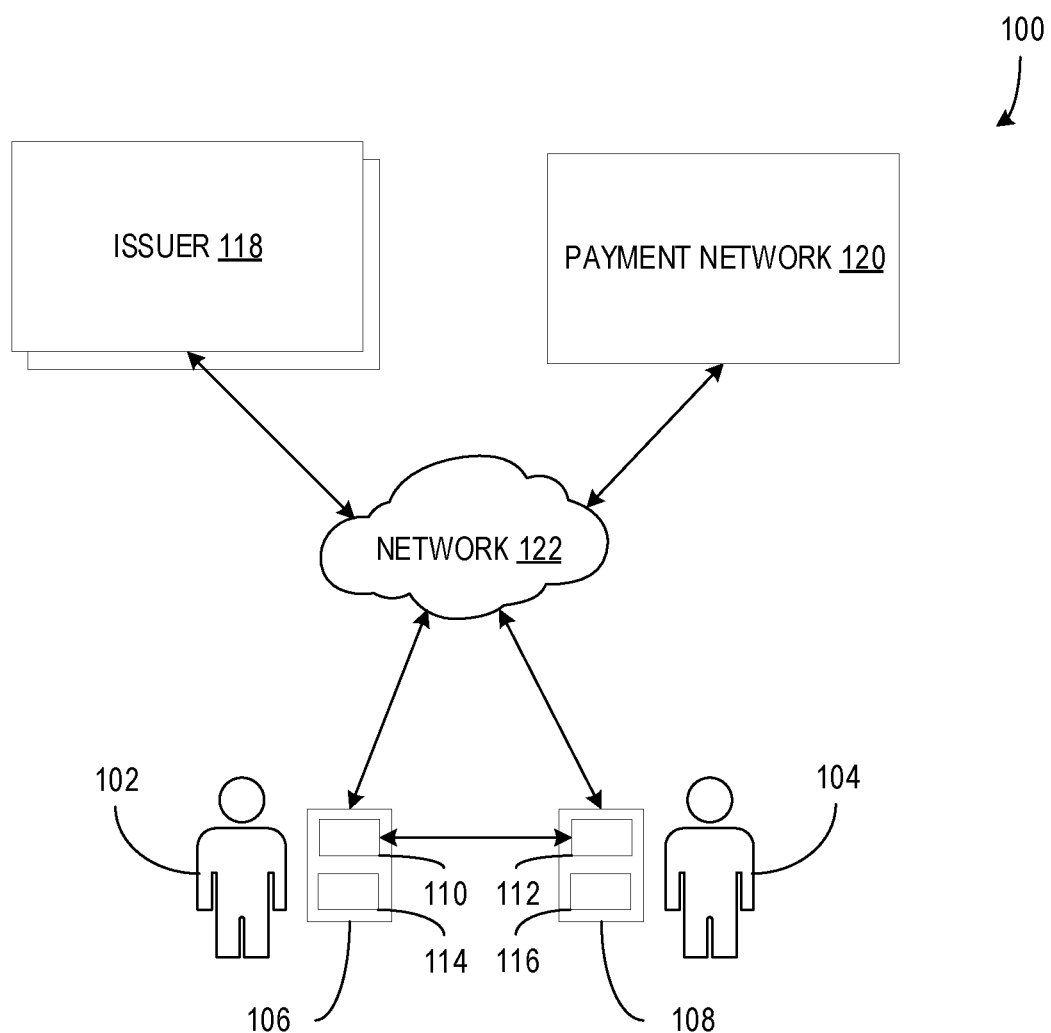
FIG. 1 is an exemplary block diagram illustrating a system configured for facilitating a peer-to-peer transaction using virtual debit accounts according to an embodiment.

FIG. 1 is an exemplary block diagram illustrating a system 100 configured for facilitating a peer-to-peer transaction using virtual debit accounts according to an embodiment. The system 100 includes a sender 102 and a recipient 104 with computing devices 106 and 108 respectively. The computing devices 106 and 108 each include transaction applications 110 and 112 and virtual debit accounts 114 and 116 respectively. The system 100 further includes at least one issuer 118 and a payment network 120 connected to a network 122 through which the issuer 118, payment network 120, and computing devices 106 and 108 may interact.

In some examples, the sender 102 and recipient 104 are people and the sender 102 wishes to send an amount of money to the recipient in the form of a peer-to-peer transaction as described herein. For instance, the sender 102 may be a customer at a restaurant and the recipient 104 may be a member of the waitstaff of the restaurant. The sender 102 may wish to provide gratuity or a tip in the form of the described peer-to-peer transaction. Other situations, such as a customer of a taxi service tipping a driver of the taxi service, may also be covered by the systems and methods described herein. Alternatively, or additionally, the sender 102 and/or the recipient 104 may include more than one person or entities other than people.

The computing devices 106 and 108 may be computing devices owned and/or used by the sender 102 and the recipient 104 respectively. They may comprise or include mobile phones, tablets, laptop computers, personal computers (PCs), wearable computing devices, or other similar personal computing devices. The computing devices 106 and 108 are each configured to store and run transaction applications 110 and 112 respectively. The computing devices 106 and 108 further include network interfaces that enable the computing devices 106 and 108 to communicate via short-range wireless communication (e.g., near field communication (NFC), BLUETOOTH wireless communication, etc.) and via networks (e.g., network 122) using other network communication protocols (e.g., wired network protocols, Wi-Fi protocols, cellular protocols, etc.). The configuration and operation of the computing devices 106 and 108 is described in greater detail below.

The transaction applications 110 and 112 are software components that are configured to facilitate the peer-to-peer transactions between computing devices (e.g., computing devices 106 and 108, etc.) as described herein. Further, the transaction applications 110 and 112 may be configured to detect other compatible transaction applications within a defined proximity via wireless communication and send records of transactions made to issuers (e.g., issuer 118, etc.) and/or other entities associated with the transactions.

The virtual debit accounts 114 and 116 are associated with the transaction applications 110 and 112 and funds sent and/or received via the transaction applications 110 and 112 are received from and/or sent to the virtual debit accounts 114 and 116. In some examples, the virtual debit accounts 114 and 116 may be known as electronic purses, or e-purses. The virtual debit accounts 114 and 116 may be loaded with funds prior to or during a transaction facilitated by the transaction applications 110 and 112. Further, the funds in the virtual debit accounts 114 and 116 may be withdrawn to other accounts by the sender 102 and/or recipient 104 or used to make other transactions and/or purchases. Virtual debit accounts 114 and 116 include unique account identifiers, such as account numbers, and they are associated with an owner of the accounts (e.g., the sender 102, the recipient 104, etc.). The virtual debit accounts 114 and 116 may further be associated with authentication information (e.g., usernames, passwords or passphrases, biometric authentication information, etc.) enabling the accounts to be accessed securely.

The at least one issuer 118 is a bank or similar entity that issues one or both of the virtual debit accounts 114 and 116. In some examples, a single issuer 118 issues both accounts, while in alternative examples, each virtual debit account is issued by separate issuers 118. The payment network 120 (e.g., MASTERCARD®, etc.) is an entity that facilitates transactions, such as payments, between accounts (e.g., virtual debit accounts 114 and 116, etc.) by interaction between issuers (e.g., issuer 118, etc.), banks, and other similar entities. It should be understood that interactions between the issuer 118 and payment network 120 with respect to facilitating transactions include processes understood by a person of ordinary skill in the art and that the interactions may occur in association with peer-to-peer transactions as described herein.

The network 122 may include one or more subnetworks of one or more types. For instance, the network 122 may include the Internet, a private intranet, and/or other networks. The network 122 may include any network organization or arrangement as understood by a person of ordinary skill in the art that enables the system 100 to provide the functionality described herein.

Figure 2:
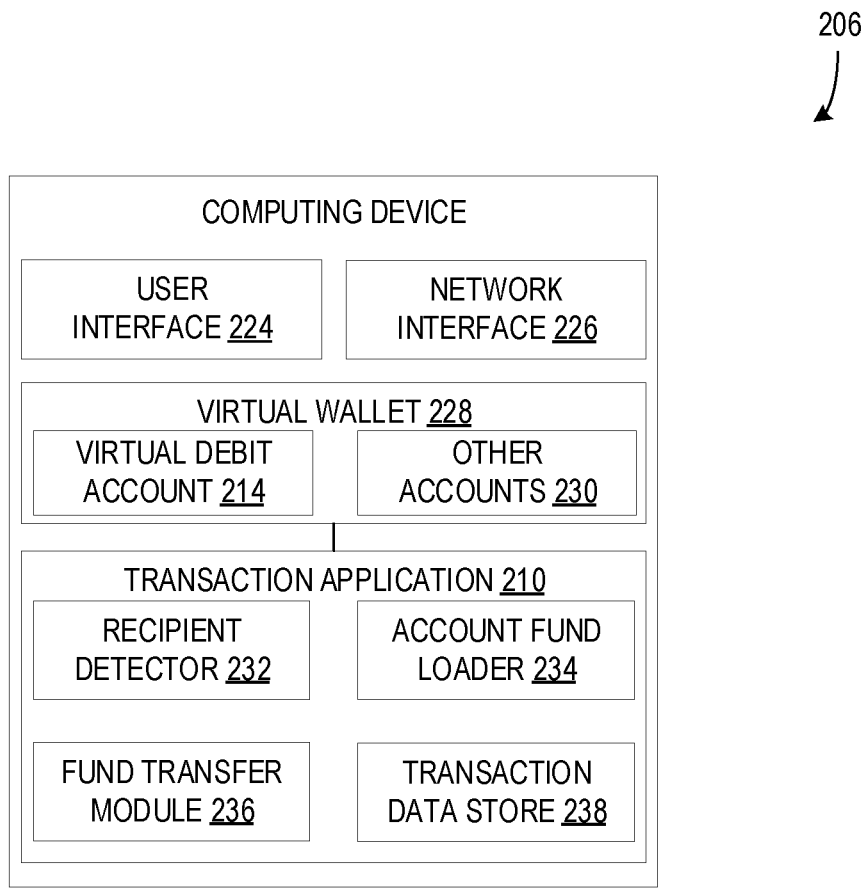
FIG. 2 is an exemplary block diagram illustrating a computing device including a virtual wallet and transaction application configured for facilitating peer-to-peer transactions according to an embodiment.

FIG. 2 is an exemplary block diagram illustrating a computing device 206 including a virtual wallet 228 and transaction application 210 configured for facilitating peer-to-peer transactions according to an embodiment. The computing device 206 includes a user interface 224 and a network interface 226. The virtual wallet 228 includes a virtual debit account 214 and one or more other accounts 230. The transaction application 210 includes a recipient detector 232, an account fund loader 234, a fund transfer module 236, and a transaction data store 238.

The user interface 224 may include one or more hardware and/or software interface components (e.g., touch screens, displays, buttons, application program interfaces (APIs), etc.) that are configured to receive input from and/or send output to a user of the computing device 206. For instance, the user interface 224 may be configured to receive and display information from the transaction application 210 (e.g., recipient detection information, virtual debit account information, fund transfer information, etc.) to the user (e.g., sender 102, recipient 104, etc.). Further, the user interface 224 may be configured to receive input from a user, such as requests to initiate transactions, requests to load funds to the virtual debit account 214, etc. The user interface 224 may include multiple types of interfaces, such as graphical user interfaces (GUIs) displayed on displays and/or screens, contact-based interfaces such as touch screens, mechanical interfaces (e.g., buttons, switches, etc.), and others (e.g., microphones, speakers, biometric sensors, accelerometers, gyroscopic sensors, etc.).

The network interface 226 may include one or more hardware and/or software interface components (e.g., wireless antennae and other components, wired network port, firmware and software network protocol interfaces, etc.) that are configured to enable the computing device 206 to communicate with other computing devices over network connections (e.g., on network 122, etc.). For instance, the network interface 226 may include a Wi-Fi interface, a BLUETOOTH protocol interface, an NFC interface, and/or a cellular protocol interface. The network interface 226 may be accessed by other applications (e.g., the transaction application 210, etc.) on the computing device 206 to interact with other devices and/or applications. For instance, the transaction application 210 may use the network interface 226 to detect other corresponding transaction applications or to communicate with the issuer 118 regarding the virtual debit account 214.

The virtual wallet 228 is a software component that stores account information on the computing device 206. In some examples, the virtual wallet 228 includes a processor configured to execute instructions to store the account information as described herein. The stored account information may be accessed by applications on the computing device 206 to perform transactions involving the accounts. The virtual debit account 214 is stored in the virtual wallet 228, along with any other accounts 230. The other accounts 230 may include, for instance, credit card accounts, other debit card accounts, bank accounts, or the like. The stored data may include account identifiers, such as account numbers, account issuers, authentication information associated with the accounts, account balance information, account transaction information, etc. The virtual wallet 228 and the account information stored therein may be used to perform transactions with other computing devices, point of sale (POS) devices, other virtual or electronic accounts over a network (e.g., network 122, etc.), etc.

The virtual debit account 214, or e-purse, is an account that is stored on the virtual wallet 228 and associated with the transaction application 210. The virtual debit account 214 includes an account identifier, account issuer information, authentication information, and an account balance. In some examples, the virtual debit account 214 may include other account information as described above. The virtual debit account 214 may further be associated with defined features and/or limitations. For instance, the virtual debit account 214 may limit the account balance to be less than or equal to a defined value or limit the size of transactions associated with the virtual debit account 214 to less than or equal to a defined value. Further features may include notifications that are sent to the owner of the virtual debit account 214 based on account balance changes and/or performed transactions (e.g., the owner may receive a notification via email, text, or computing device-based notification that a transaction has been performed, that a transaction exceeding a defined amount has been performed, that the account balance of the virtual debit account 214 has fallen below a defined value, etc.). The features and/or limitations of the virtual debit account 214 may be defined by default when the virtual debit account 214 is initially set up and/or configured by the user of the virtual debit account 214 through the transaction application 210. The virtual debit account 214 is separate from other accounts, but the transaction application 210 may be configured to load funds from and/or withdraw funds to one or more other accounts 230 of the virtual wallet 228 or other accounts outside of the virtual wallet 228 as described below.

The transaction application 210 is a software component that facilitates the transactions between a sender virtual debit account and a recipient virtual debit account. In some examples, the transaction application 210 includes a processor configured to execute instructions to facilitate the transactions between virtual debit accounts as described herein. The transaction application 210 comprises subcomponents including a recipient detector 232, an account fund loader 234, a fund transfer module 236, and a transaction data store 238. Other software components may be included within the transaction application 210 as necessary to provide the functionality described herein.

In some examples, the transaction application 210 is provided by and/or associated with the issuer (e.g., issuer 118, etc.) of the virtual debit account 214. For instance, the transaction application 210 may be configured as a portion of an issuer-based application that provides a user with information about accounts and with abilities to make changes to accounts, transfer funds, etc. The transaction application 210 may be accessed by a user selecting an option to initiate a transaction (e.g., provide gratuity to a service worker, etc.). Alternatively, the transaction application 210 may be associated with a payment network (e.g., payment network 120, etc.), other bank entity, or it may be independent from other entities.

The recipient detector 232 of the transaction application 210 uses hardware and/or software components of the computing device 206 to detect other computing devices (e.g., computing device 108, etc.) that include compatible transaction applications (e.g., transaction application 112, etc.). In some examples, the recipient detector 232 includes a processor configured to execute instructions to detect other computing devices that include compatible transaction applications as described herein. The recipient detector 232 may be activated upon a user of the computing device 206 initiating a transaction in the transaction application 210 (e.g., a user may select to provide a gratuity or tip within the transaction application 210 interface, etc.). The recipient detector 232 activates and/or uses the network interface 226 to communicate with other computing devices and/or detect signals from other computing devices, confirms the presence of compatible transaction applications on the computing devices, and generates indicators of one or more computing devices with compatible transaction applications for selection as a recipient by a user.

In an example, the recipient detector 232 activates a near field communication (NFC) component of the network interface 226 and uses it to detect other computing devices within a proximity of the computing device 206. The proximity may be based on limitations of the NFC component itself or on defined proximity or distance values associated with the recipient detector 232 and/or the transaction application 210. The detected other computing devices may also include NFC components for communication with the computing device 206 and other computing devices. The transaction application 210 and any compatible transaction applications on the other computing devices may be configured to emit, project, or otherwise provide information indicating an identifier, type, and/or version of transaction application that is used by detecting transaction applications to determine compatibility between the applications. For instance, transaction application 210 may be provided by issuer 118 and it may be compatible with other transaction applications also provided by the issuer 118. A code or other identifier associated with the issuer 118-based transaction applications may be provided during recipient detection, enabling the transaction applications to recognize shared compatibility or lack thereof. Alternatively, transaction application 210 may be compatible with transaction applications associated with other issuers, payment networks, or banks, or with transaction applications that are independent from such entities. In this case, the various types of transaction applications may include defined, shared standards that enable the applications to maintain compatibility. In some examples, compatibility with the transaction application 210 requires that the recipient computing device and/or transaction application be associated with a virtual debit account with similar or identical features of the virtual debit account 214.

The recipient detector 232 may also detect computing devices with compatible transaction applications using BLUETOOTH wireless components, Wi-Fi components, or other types of network components. For instance, the recipient detector 232 may detect other computing devices that are connected to the same Wi-Fi router, such that the effective range of the router is the detection proximity of the recipient detector 232. Alternatively, or additionally, detection may be based on global positioning system (GPS) locations of the computing device 206 and other computing devices that may potentially be detected. For instance, the recipient detector 232 may detect compatible computing devices (computing devices with compatible transaction applications) within a defined geographic proximity by accessing an Internet or other network-based server on which compatible computing devices and associated locations are registered.

After detecting one or more compatible computing devices, the recipient detector 232 may communicate the compatible computing devices to a user via the user interface 224. For instance, a plurality of compatible computing devices may be displayed to a user on a display or touchscreen of the computing device 206. The compatible computing devices may be identified by a device name and/or code (e.g., "Tom's tablet", "Sally's phone—#1234", etc.), where a code may be provided for unique identification when devices with identical or similar names are present. The user is enabled to select a compatible computing device with which to initiate a transaction.

The account fund loader 234 is a software component that is configured to enable a user to load funds on the virtual debit account 214. In some examples, the account fund loader 234 includes a processor configured to execute instructions to enable the user to load funds to the virtual debit account 214 as described herein. The account fund loader 234 may receive a load request or instruction from a user via the user interface 224 and cause funds to be loaded to or withdrawn from the virtual debit account 214. Loaded funds may be from any of the other accounts 230 of the virtual wallet 228 or other accounts not associated with the virtual wallet 228. The account fund loader 234 may be configured to collect fund load or withdrawal information from a user, such as source account identifiers, destination account identifiers, amount to be loaded or withdrawn, etc. For instance, a user may provide source account information by selecting an account of the other accounts 230 and amount to be loaded by entering the amount to be loaded on the user interface 224. Once the information associated with the fund load or withdrawal action is collected, the account fund loader 234 may cause an associated transaction to be initiated. This may include changing the fund balance values of the source account and destination account to reflect the load or withdrawal action and/or communicating with the issuer, payment network, or other associated entity to cause the transaction to occur and/or record the occurrence of the transaction.

In some examples, the account fund loader 234 is configured to include a default source account for loading funds to the virtual debit account 214. For instance, the user of the computing device 206 may select an account of the other accounts 230 as the default account. When a load or withdrawal action occurs in the future, the default account may be selected by default. The user may also be provided with an option to select a different account if desired. Further, after defining the default account, the user may be provided an option to do a "quick load" operation, enabling the user to quickly select an amount to be loaded to the virtual debit account 214 and causing that amount to be loaded from the default account with minimal or no further action by the user.

The account fund loader 234 may also be configured for automatic fund loading from a defined default account to the virtual debit account 214 in some circumstances. Rules may be defined that enable automatic fund loading when conditions of the rules are satisfied. In an example, when a transaction to a compatible computing device is initiated as described herein, if the balance of the virtual debit account 214 is less than the amount to be transferred in the initiated transaction, the account fund loader 234 may automatically load funds to the virtual debit account 214 to make up for the difference, such that the virtual debit account 214 contains sufficient funds for the initiated transaction. For instance, if the virtual debit account 214 has a $5 balance and the user initiates a transaction for $7, the account fund loader 234 may cause $2 or more to be loaded onto the virtual debit account 214 from the default source account. In some examples, the amount loaded automatically may be the exact amount necessary to make up the difference in values. Alternatively, the account fund loader 234 may be configured to load a defined amount (e.g., $5 increments, $10 increments, etc.) per automatic load transaction or to load the virtual debit account 214 up to a defined balance amount (e.g., the virtual debit account 214 is loaded to a defined balance of $30 when funds are insufficient for a transaction, etc.). This may reduce the number of automatic load transactions when a user is initiating many small transactions in succession. Automatic load transactions may also be limited by rules defining maximum amounts that may be automatically loaded to the virtual debit account 214 at once and/or over time (e.g., automatic load transactions may be limited to $10 or less, or $20 over the course of a day, etc.).

The fund transfer module 236 is a software component that is configured to transfer funds from the virtual debit account 214 to a virtual debit account on a compatible computing device that has been selected as a recipient via the recipient detector 232 as described above. In some examples, the fund transfer module 236 includes a processor configured to execute instructions to transfer funds between virtual debit accounts as described herein. The fund transfer module 236 receives the recipient computing device information from the recipient detector 232 and collects or otherwise obtains a transaction amount to be transferred to the recipient computing device. The transaction amount may be collected from the user of the computing device 206 via the user interface 224 or it may have already been obtained previously in the process (e.g., when the user initiates the transaction request prior to detecting recipients, etc.). The fund transfer module 236 may communicate the transaction amount and any related transaction information (e.g., identification information associated with the computing device 206 and/or the virtual debit account 214, a user-provided comment associated with the transaction, etc.) to the recipient computing device. Communicating to the recipient computing device may be done via the network interface 226 using the same protocols and/or modules used to detect the recipient or using different protocols and/or modules.

The fund transfer module 236 may be configured to then wait for confirmation of the initiated transaction from the recipient computing device and, upon receiving the confirmation, the fund transfer module 236 may be configured to update the virtual debit account 214 to reflect the transfer of the transaction amount from the virtual debit account 214 to an account associated with the recipient computing device.

In some examples, a recipient transaction application also includes a fund transfer module that is configured to receive communications from the sender transaction application 210 associated with an initiated transaction. The fund transfer module may cause transaction information (e.g., an identifier of the sender computing device and/or transaction application, the transaction amount, etc.) to be displayed to the user of the recipient computing device for confirmation or denial. The user's confirmation or denial is communicated back to the fund transfer module 236 on the sender computing device 206. A denial prevents the initiated transaction from being completed, while a confirmation allows the initiated transaction to be completed as described herein. The recipient's transaction application may further include the functionality of the sender's transaction application 210, including enabling the recipient to transfer funds to and/or from the recipient's virtual debit account, initiate peer-to-peer transfers to others' virtual debit accounts, etc.

When the initiated transaction is completed (e.g., funds are successfully transferred between the virtual debit account 214 and the account associated with the recipient computing device, etc.), a record of the transaction is stored in the transaction data store 238. The transaction records stored in the transaction data store 238 may include identifiers of the two parties to the transaction (e.g., the sender virtual debit account 214 and the recipient virtual debit account 116, etc.), an amount that was transferred, a date and time of the transaction, a memo or comment associated with the transaction, etc. Records on the transaction data store 238 may be stored indefinitely, they may be stored for a defined period of time, they may be stored until the transaction has been sent to the issuer(s) associated with the transaction, or the like. For instance, the transaction data store 238 may be configured to store transaction records for seven days. Alternatively, or additionally, the transaction application 210 may be configured to send the stored transaction records to the issuer of the virtual debit account 214 at a defined time and, after the transaction records are sent to the issuer, the transaction application 210 may remove them from the transaction data store 238.

In some examples, the transaction records are stored in transaction data stores of both the sender transaction application and the recipient transaction application, preserving the transaction record redundantly and enabling the issuer(s) or other entities associated with the accounts of the transaction to confirm accuracy of transaction records by comparing the records from both transaction data stores.

Transaction records may be created, stored in the transaction data store 238, and/or provided to associated issuers via a standard application program interface (API) provided by an issuer, payment network or the like. For instance, transaction records may be recorded on both sides of a transaction using MASTERCARD Digital Enablement Service (MDES).

The transaction application 210 is configured to provide transaction records to the issuer of the virtual debit account 214, and the transaction application 210 may also provide the transaction record to an issuer of the virtual debit account of the recipient as well. In some examples, the transaction application 210 may send the transaction records to issuer(s) as soon as possible, while in alternative examples, the transaction application 210 may only send transaction records to issuer(s) in a defined time frame, when the transaction data store 238 contains a defined number of unsent transaction records or the like. In circumstances where transactions occur but the computing device 206 is unable to contact the issuer of the virtual debit account(s) involved in the transaction (e.g., a network connection to the issuer(s) has failed, etc.), the transaction records remain stored in the transaction data store 238 until contact with the issuer can be restored.

Figure 3:
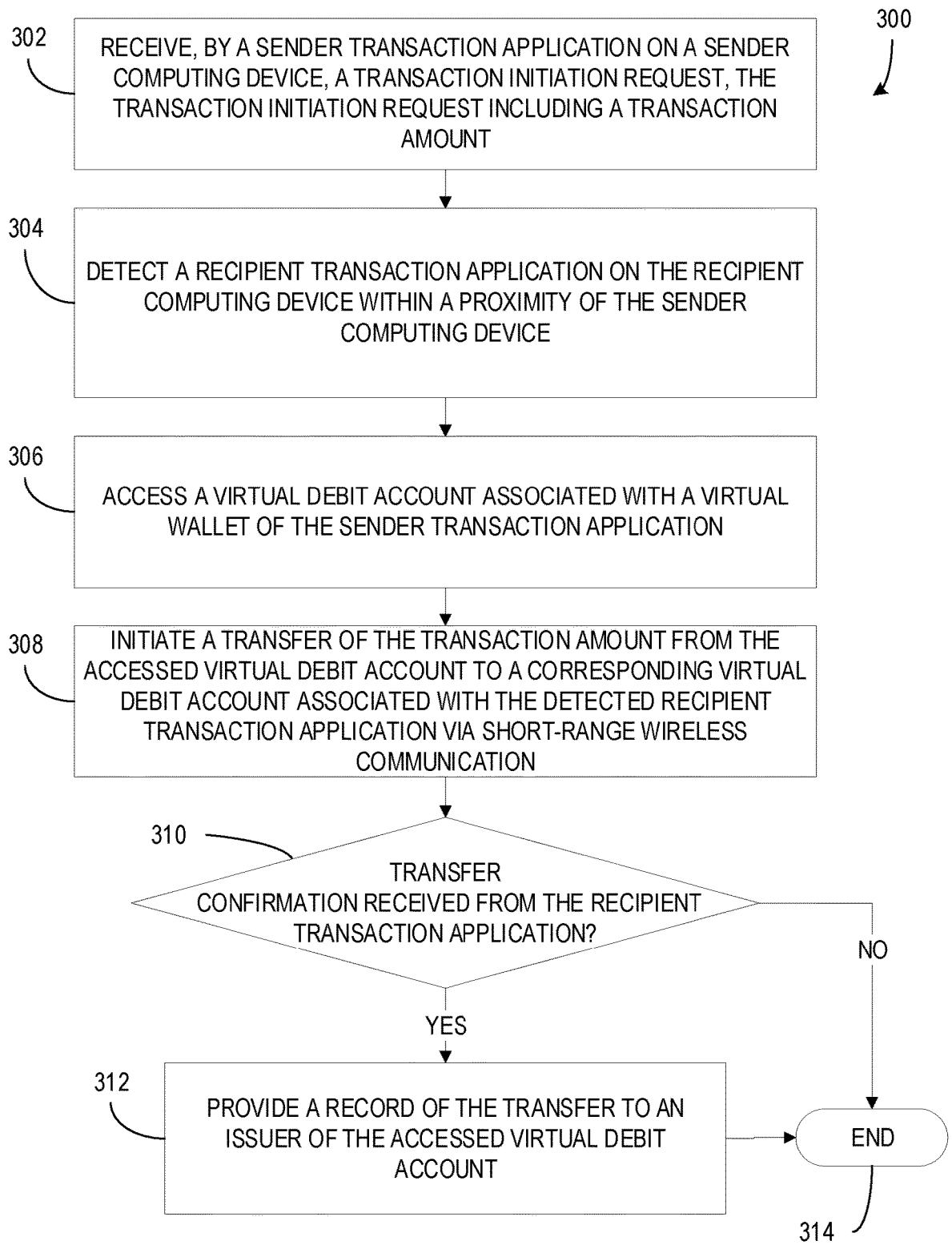
FIG. 3 is an exemplary flow chart illustrating transferring a transaction amount from a sender's virtual debit account to a recipient's corresponding virtual debit account according to an embodiment.

FIG. 3 is an exemplary flow chart 300 illustrating transferring a transaction amount from a sender's virtual debit account to a recipient's corresponding virtual debit account according to an embodiment. The process described by flow chart 300 may be executed, partially or entirely, on a computing device of the sender (e.g., computing device 206, etc.). At 302, a transaction initiation request, including a transaction amount, is received. The transaction initiation request may be received from the sender via a user interface of the sender's computing device. For instance, the sender may select to initiate a transaction on a graphical user interface (GUI) displayed on the screen of the sender's computing device. The sender may be prompted to input a transaction amount on the GUI after selecting to initiate the transaction. The GUI may be based on a transaction application (e.g., transaction application 210, etc.) of the computing device and/or it may be accessed from within an application associated with an issuer, payment network, bank, or the like, as described herein.

At 304, a recipient transaction application on a recipient computing device is detected within a proximity of the sender computing device. The sender transaction application is configured to detect computing devices that include transaction applications that are compatible with the sender transaction application as described herein. In some examples, the detection of recipient computing devices is not based on the sender transaction application including an identifier or other link to the recipient computing devices (e.g., a link to a recipient user profile, a recipient username, recipient email, etc.) prior to detection of the recipient computing devices. Detection of the recipient computing device may include use of a network interface to detect computing devices that are also using network interfaces and/or that have active network interfaces (e.g., NFC, BLUETOOTH communication, etc.) as described herein. Compatibility of detected computing devices includes confirming, by communication and/or interaction with the detected computing devices, the presence of a transaction application and/or a virtual debit account with properties similar or identical to properties of the transaction application and/or virtual debit account of the sender computing device.

At 306, a virtual debit account associated with a virtual wallet of the sender transaction application is accessed. The virtual debit account is configured for sending and receiving funds via the sender transaction application. Accessing the virtual debit account may include determining a balance amount of the virtual debit account. Other data of the virtual debit account may also be collected upon access, including past transactions, rules or features of the virtual debit account that may affect whether funds are loaded to the virtual debit account, etc.

At 308, a transfer of the transaction amount is initiated from the accessed virtual debit account to a corresponding virtual debit account associated with the detected recipient transaction application. The transfer is initiated by the transaction application of the sender computing device. The transfer may include sending transaction information to the recipient computing device (e.g., a transaction amount, an identifier of the sender transaction application and/or sender computing device, a memo or comment associated with the transaction, etc.). For instance, a customer at a restaurant may initiate a transfer to a server at the restaurant to give a tip to the server. The customer's transaction application may send the customer's computing device name, a tip amount, and, optionally, a comment from the customer that may indicate what the tip is for. Further, the customer's name or a photo of the customer may be included in the transfer initiation so that the server may more easily identify the source of the tip.

At 310, if a confirmation of the initiated transfer is received from the recipient transaction application, a record of the transfer is provided to an issuer of the accessed virtual debit account at 312. The recipient may view transaction information sent during the transfer initiation and then provide a confirmation. The recipient's computing device may provide the confirmation option to the recipient via a user interface and, upon receiving the confirmation from the recipient, the recipient's computing device sends the confirmation to the sender transaction application. For instance, in the above-mentioned tipping example, the server may receive a notification that the customer wants to send a tip, view the transaction information that was sent from the customer's transaction information, and confirm that the customer is one of the server's customers and that the transfer initiation is not in error. The server may then touch a confirmation button on the user interface of the server's computing device to cause a confirmation to be sent to the customer's transaction application.

The record of the transfer may be provided to the issuer of the sender's virtual debit account after the transfer is completed as described herein. The provision of transfer records may occur as soon as possible after the transfer, at a defined time interval, or in response to a number of stored transfer records to be provided, etc.

Alternatively, if a confirmation is not received at 310, the process ends at 314.

In some examples, transaction applications (e.g., transaction applications 210, 112, etc.) use biometric interfaces (e.g., fingerprint scanning interfaces, eye scanning interfaces, voice recognition interfaces, etc.) to authenticate senders and/or recipients during the process of facilitating a transaction between the sender and recipient. For instance, the sender's transaction application may prompt the sender to provide a fingerprint upon the sender requesting that the transaction be initiated to confirm the identity of the sender and enhance the security of the transaction. Alternatively, or additionally, a recipient's transaction application may prompt the recipient to provide voice input (e.g., request that the recipient says "Confirm Transaction", etc.) to confirm the transaction from a sender.

Figure 4:
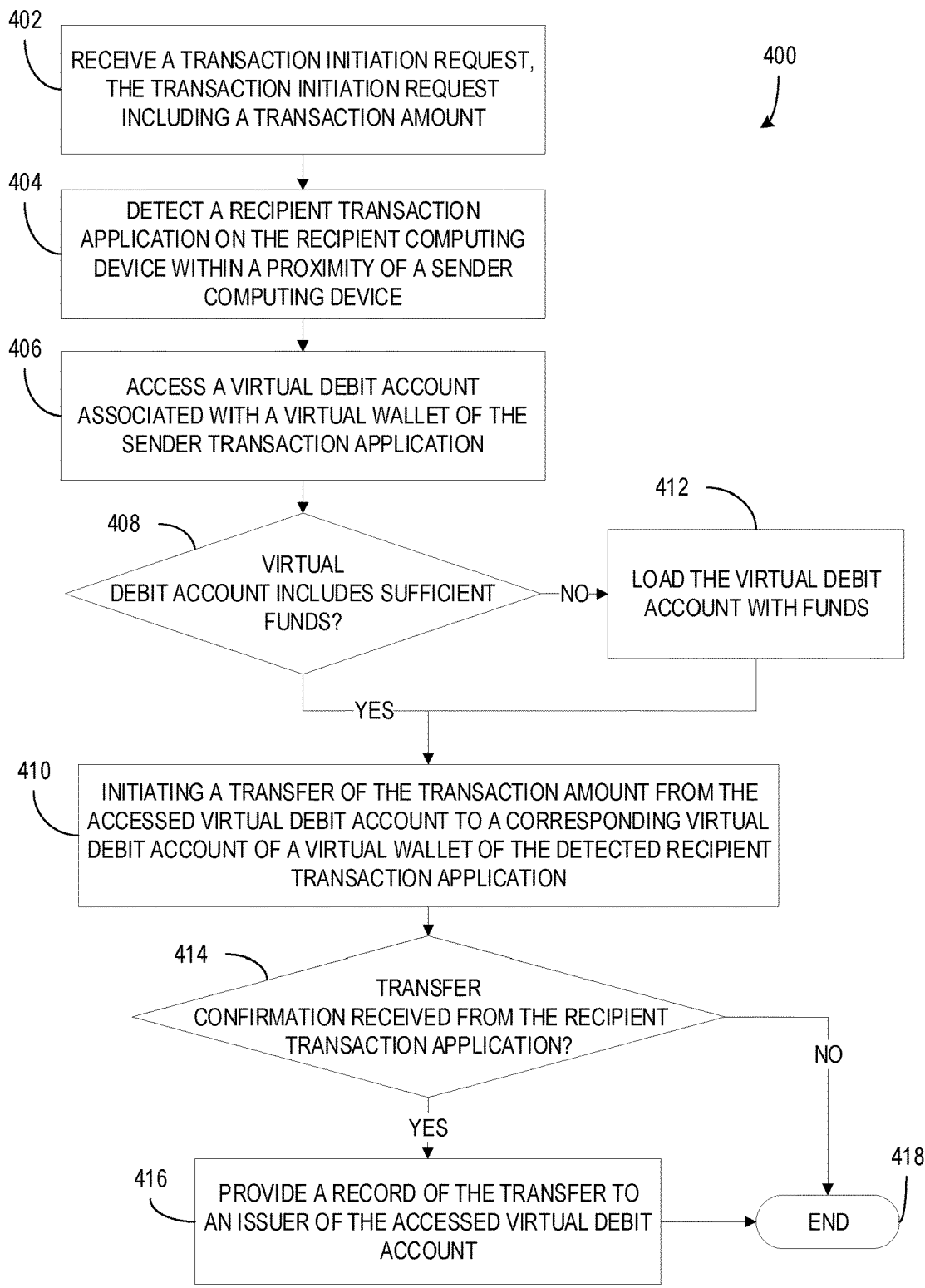
FIG. 4 is an exemplary flow chart illustrating the process of FIG. 3, further including confirming sufficient funds are present in the sender's virtual debit account or loading sufficient funds to the sender's virtual debit account according to an embodiment.

FIG. 4 is an exemplary flow chart 400 illustrating the process of FIG. 3, further including confirming sufficient funds are present in the sender's virtual debit account or loading sufficient funds to the sender's virtual debit account according to an embodiment. From 402-406, a transaction initiation request is received, a recipient transaction application is detected, and a virtual debit account is accessed as described above with respect to FIG. 3. At 408, if the accessed virtual debit account includes sufficient funds (e.g., at least the transaction amount of the transaction initiation request, etc.), the transfer of the transaction amount is initiated from the accessed virtual debit account to the corresponding virtual debit account associated with the detected recipient transaction application at 410.

Alternatively, if the accessed virtual debit account does not include sufficient funds for the requested transaction at 408, the accessed virtual debit account is loaded with funds at 412. Accessing the virtual debit account includes determining the balance value of the virtual debit account and the transaction amount has been provided in the transaction initiation request. In some examples, the sender transaction application causes funds to be loaded to the virtual debit account by notifying the sender to load funds to the virtual debit account or by automatically loading funds to the virtual debit account from a default source account as described above. When the sender is notified to load funds to the virtual debit account, a user interface may be presented to the sender that enables the sender to select a source account and/or to provide a load amount to be loaded to the virtual debit account. The user interface may further display the amount that is required to be loaded for the virtual debit account to have sufficient funds for the associated transaction to be completed. The sender may select to load the required amount or more than the required amount from the selected source account to the virtual debit account.

From 414-416, the transfer confirmation may be received from the recipient transaction application and a record of the transfer may be provided to an issuer of the accessed virtual debit account as described above with respect to FIG. 3. At 418, the process of flow chart 400 ends.

Figure 5:
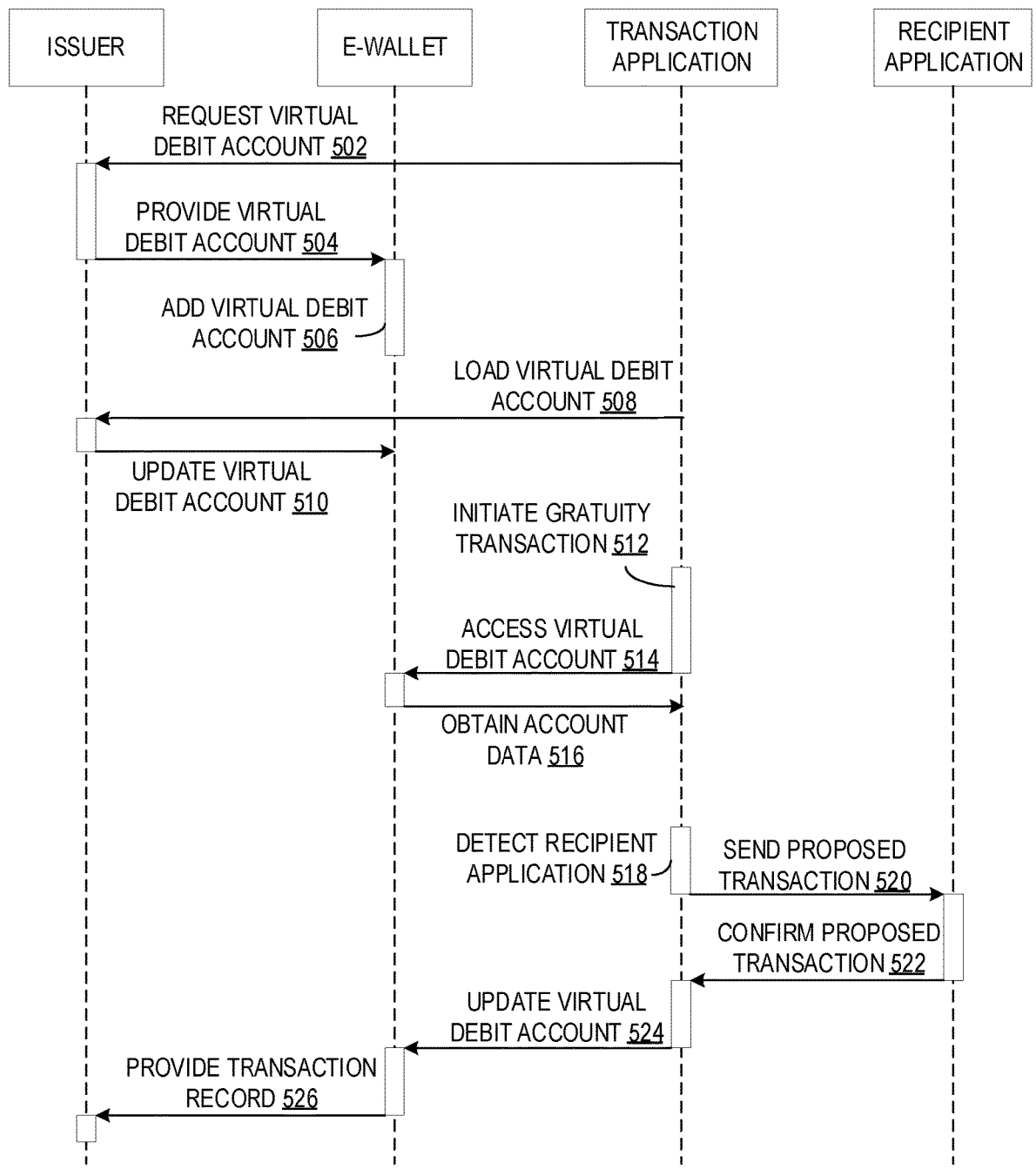
FIG. 5 is an exemplary sequence diagram illustrating interactions between an issuer, e-wallet, sender's transaction application, and recipient's transaction application according to an embodiment.

FIG. 5 is an exemplary sequence diagram 500 illustrating interactions between an issuer (e.g., issuer 118, etc.), e-wallet, or electronic wallet, (e.g., virtual wallet 228, etc.), sender's transaction application (e.g., transaction application 210, etc.), and recipient's transaction application (e.g., transaction application 112, etc.) according to an embodiment. At 502, the transaction application requests a virtual debit account from the issuer. In some examples, when a virtual debit account associated with the transaction application has not been created, the user may request that a virtual debit account be created, or issued, by the issuer. The transaction application communicates the request with the issuer, including information about the user (e.g., a name of the user, accounts associated with the user, etc.) and the issuer creates the virtual debit account using typical account issuing techniques. At 504, the created virtual debit account is provided to the e-wallet for use by the user. The virtual debit account is added to the e-wallet, including an identifier of the account, such as an account number, an identifier of the issuer, limitations or features of the virtual debit account (e.g., balance limits, fund loading rules, etc.), etc. At 506, the e-wallet adds the provided virtual debit account to the list of accounts in the e-wallet, enabling it for use in making purchases, fund transfers, or the like via the e-wallet.

At 508, the transaction application causes the virtual debit account to be loaded with funds as described herein. The fund loading may be caused by a user of the transaction application choosing to load funds or it may be caused automatically based on a requested transaction as described above. The fund loading action may cause the transaction application to communicate with the e-wallet and/or with the issuer to cause funds to be transferred from another account to the virtual debit account. Once the fund loading is complete at the issuer, the issuer may cause the virtual debit account to be updated on the e-wallet at 510, causing the loaded funds to be reflected in the balance amount of the virtual debit account on the e-wallet.

At 512, the transaction application initiates a gratuity transaction (e.g., a transaction as described above with respect to FIGS. 2, 3, and 4, etc.). The transaction application accesses the virtual debit account at 514 in response to the initiated gratuity transaction. Accessing the virtual debit account may include obtaining account data at 516, such as the balance value of the virtual debit account, as well as information about transaction limitations, balance limitations, and or fund loading features of the virtual debit account.

At 518, the recipient application is detected by the transaction application as described herein. The proposed transaction is sent from the transaction application to the recipient application at 520. The recipient application may be used to confirm or deny the proposed transaction. In the illustrated example, the proposed transaction is confirmed, and the confirmation is sent from the recipient transaction to the transaction application at 522.

Based on the confirmed transaction, the transaction application updates the virtual debit account in the e-wallet at 524, changing the balance value of the virtual debit account to reflect the transfer of the transaction amount from the virtual debit account to an account associated with the recipient application. Further, at 526, a record of the transaction is provided to the issuer based on the changes to the virtual debit account in the e-wallet. The communication to the issuer may be from the transaction application or from the e-wallet itself, based on the configuration thereof.

In some examples, the recipient application may also provide a record of the transaction to the issuer or another issuer associated with the recipient's virtual debit account.

Additional Example Scenarios

Aspects of the disclosure enable various additional scenarios, such as next described.

In an example, a customer at a restaurant wants to use a mobile phone to tip a server. The customer opens a transaction application associated with a bank with which the customer has a virtual debit account. The customer chooses to initiate a gratuity transaction, which causes the customer's mobile phone to display a recipient selection interface. The mobile phone scans the surrounding area using BLUETOOTH and identifies several active mobile phones belonging to servers at the restaurant. The customer selects the mobile phone that corresponds with the name of the server the customer wants to tip. The customer inputs the amount to tip the customer and confirms the recipient selection and the tip amount using an interface on the mobile phone. The customer is prompted to provide a fingerprint on a biometric sensor of the mobile phone and, upon providing the fingerprint, the transaction application of the mobile phone sends the proposed tip transaction to the server's mobile phone and associated transaction application. The server's transaction application notifies the server of an incoming tip transaction, the notification including a name of the customer and a picture of the customer that the customer had previously provided to their transaction application. The server recognizes the customer and confirms the tip transaction. The tip amount is transferred from the customer's virtual debit account to the server's virtual debit account and the transfer is reflected in notifications provided to both the customer and the server. The customer's transaction application and the server's transaction application contact the issuers of each corresponding virtual debit account to provide a record of the transaction.

In another example, a passenger wishes to provide a tip to a driver using a transaction application on a mobile phone. The passenger opens the transaction application and selects to initiate a gratuity transaction. The transaction application scans for possible recipients and identifies an active transaction application associated with a computing device of the driver. The driver's computing device is provided as an option to the passenger, who selects the driver's computing device after confirming that the name is a match with the driver. The passenger enters a tip amount and initiates the transaction. The transaction application accesses a virtual debit account of the passenger and determines that the current balance of the virtual debit account is insufficient to cover the tip amount entered by the passenger. The transaction application identifies a default source account for fund loading actions and causes funds sufficient to cover the tip amount to be transferred from the default source account to the virtual debit account. The passenger's transaction application notifies the passenger that the automatic fund loading has occurred. The transaction application sends the proposed tip transaction to the driver's transaction application and the driver is notified of the pending transaction. The driver confirms the transaction and the confirmation is returned to the passenger's transaction application. Both transaction applications create records of the transaction and update balances of associated virtual debit accounts to reflect the transaction. However, when the passenger's transaction application attempts to provide the transaction record to the issuer of the passenger's virtual debit account, the transaction application is unable to communicate with the issuer due to loss of network connectivity. The transaction application maintains the transaction record and later, when network connectivity with the issuer is restored, the transaction record is provided at that point.

Exemplary Operating Environment

Figure 6:
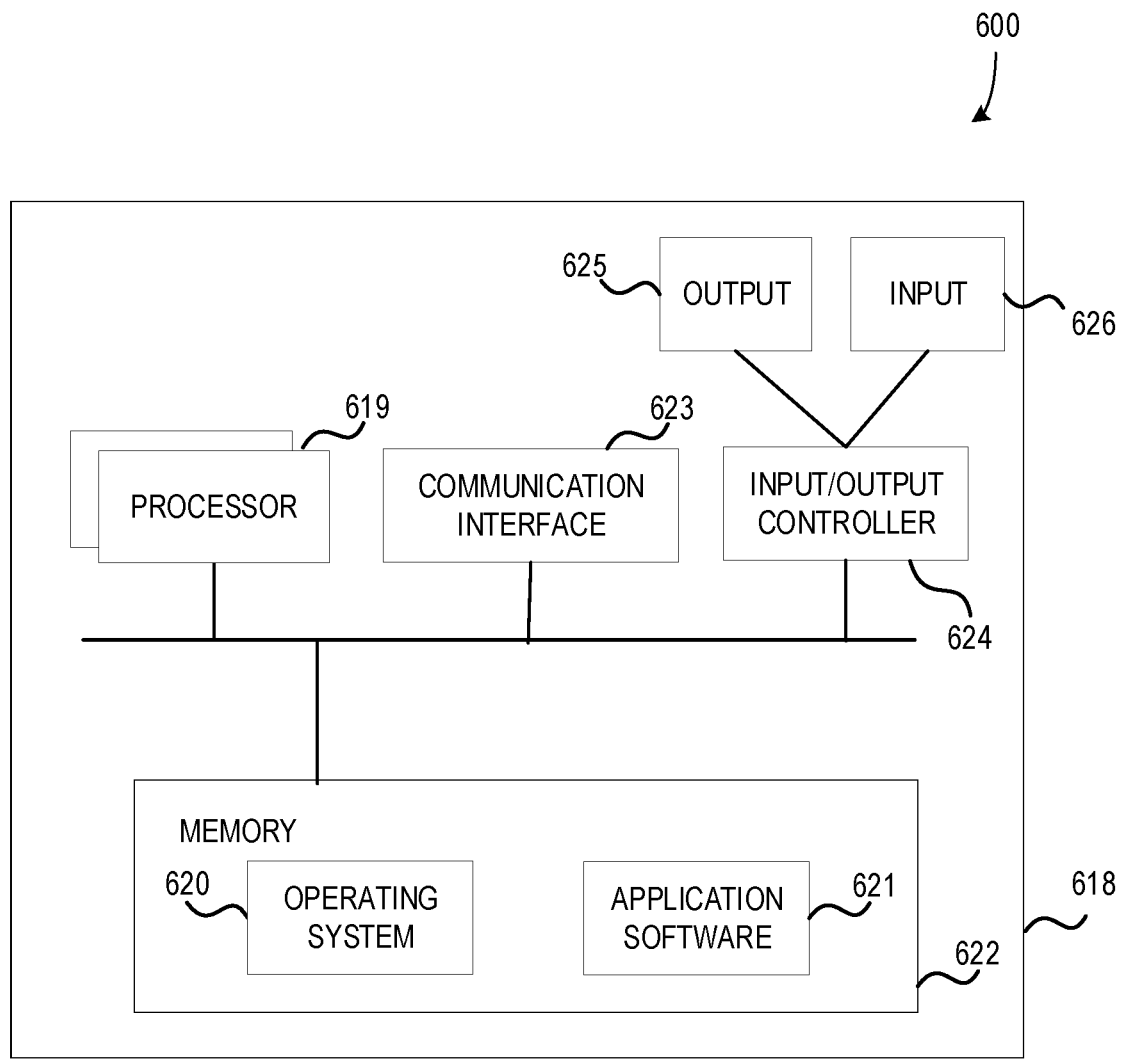
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, facilitating transactions between virtual debit accounts associated with corresponding transaction applications as described herein may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for facilitating a transaction to a recipient computing device, the system comprising:

at least one processor;

at least one memory comprising computer program code, the at least one memory and computer program code of a sender transaction application configured to, with the at least one processor, cause the at least one processor to:

receive, by a sender transaction application on a sender computing device, a transaction initiation request, the transaction initiation request including a transaction amount;

detect a recipient transaction application on the recipient computing device within a proximity of the sender computing device;

access a virtual debit account associated with a virtual wallet of the sender transaction application;

initiate a transfer of the transaction amount from the accessed virtual debit account to a corresponding virtual debit account associated with the detected recipient transaction application via short-range wireless communication; and upon a confirmation of the transfer being received from the recipient transaction application, provide a record of the transfer to an issuer of the accessed virtual debit account.

The system described above, wherein detecting the recipient transaction application on the recipient computing device includes:

detecting a plurality of transaction applications on a plurality of computing devices within the proximity of the sender computing device; and selecting the recipient transaction application from the plurality of transaction applications based on selection input received from a user of the sender computing device.

The system described above, the at least one memory and computer program code configured to, with the at least one processor, further cause the at least one processor to:

receive an account load instruction, the account load instruction including a load amount and an account identifier of a source account; and upon receiving the account load instruction, cause, by the sender transaction application, the load amount to be transferred from the source account to the virtual debit account of the sender transaction application.

The system described above, the at least one memory and computer program code configured to, with the at least one processor, further cause the at least one processor to, upon the transaction amount exceeding a balance amount of the virtual debit account of the sender transaction application by a difference amount, cause a load amount greater than or equal to the difference amount to be transferred to the virtual debit account from a source account associated with the virtual wallet of the sender transaction application.

The system described above, wherein causing the load amount to be transferred to the virtual debit account from the source account includes providing a notification that the transaction amount exceeds the balance amount and receiving an account load instruction including the load amount and an account identifier of the source account.

The system described above, the at least one memory and computer program code configured to, with the at least one processor, further cause the at least one processor to record the record of the transfer in a transaction data store of the sender transaction application, wherein the transaction data store is configured to store records for a defined time period.

The system described above, wherein detecting the recipient transaction application on the recipient computing device includes detecting the recipient computing device based on at least one of a near-field communication (NFC) protocol or a BLUETOOTH protocol.

A computerized method for facilitating a transaction to a recipient computing device comprising:

receiving, by a sender transaction application on a sender computing device, a transaction initiation request, the transaction initiation request including a transaction amount;

detecting, by the sender transaction application, a recipient transaction application on the recipient computing device within a proximity of the sender computing device;

accessing, by the sender transaction application, a virtual debit account associated with a virtual wallet of the sender transaction application;

initiating, by the sender transaction application, a transfer of the transaction amount from the accessed virtual debit account to a corresponding virtual debit account associated with the detected recipient transaction application via short-range wireless communication; and upon a confirmation of the transfer being received from the recipient transaction application, providing, by the sender transaction application, a record of the transfer to an issuer of the accessed virtual debit account.

The computerized method described above, wherein detecting the recipient transaction application on the recipient computing device includes:

detecting a plurality of transaction applications on a plurality of computing devices within the proximity of the sender computing device; and selecting the recipient transaction application from the plurality of transaction applications based on selection input received from a user of the sender computing device.

The computerized method described above, further comprising receiving, by the sender transaction application, an account load instruction, the account load instruction including a load amount and an account identifier of a source account; and upon receiving the account load instruction, causing, by the sender transaction application, the load amount to be transferred from the source account to the virtual debit account of the sender transaction application.

The computerized method described above, further comprising, upon the transaction amount exceeding a balance amount of the virtual debit account of the sender transaction application by a difference amount, cause a load amount greater than or equal to the difference amount to be transferred to the virtual debit account from a source account associated with the virtual wallet of the sender transaction application.

The computerized method described above, wherein causing the load amount to be transferred to the virtual debit account from the source account includes providing a notification that the transaction amount exceeds the balance amount and receiving an account load instruction including the load amount and an account identifier of the source account.

The computerized method described above, further comprising recording, by the sender transaction application, the record of the transfer in a transaction data store of the sender transaction application, wherein the transaction data store is configured to store records for a defined time period.

The computerized method described above, wherein detecting the recipient transaction application on the recipient computing device includes detecting the recipient computing device based on at least one of a near-field communication (NFC) protocol or a BLUETOOTH protocol.

The computerized method described above, further comprising authenticating a user of the sender computing device based on at least one of password data or biometric data upon initiation of the transfer of the transaction amount from the accessed virtual debit account to the corresponding virtual debit account.

The computerized method described above, wherein the sender transaction application is configured for detecting corresponding transaction applications without registering the corresponding transaction applications with the sender transaction application.

One or more computer storage media having computer-executable instructions for facilitating a transaction to a recipient computing device that, upon execution by a processor, cause the processor to at least:

receive, by a sender transaction application on a sender computing device, a transaction initiation request, the transaction initiation request including a transaction amount;

detect a recipient transaction application on the recipient computing device within a proximity of the sender computing device;

access a virtual debit account associated with a virtual wallet of the sender transaction application;

initiate a transfer of the transaction amount from the accessed virtual debit account to a corresponding virtual debit account associated with the detected recipient transaction application via short-range wireless communication; and upon a confirmation of the transfer being received from the recipient transaction application, provide a record of the transfer to an issuer of the accessed virtual debit account.

The one or more computer storage media described above, wherein detecting the recipient transaction application on the recipient computing device includes:

detecting a plurality of transaction applications on a plurality of computing devices with the proximity of the sender computing device; and selecting the recipient transaction application from the plurality of transaction applications based on selection input received from a user of the sender computing device.

The one or more computer storage media described above, wherein the computer-executable instructions that, upon execution by a processor, further cause the processor to at least:

receive an account load instruction, the account load instruction including a load amount and an account identifier of a source account; and upon receiving the account load instruction, cause, by the sender transaction application, the load amount to be transferred from the source account to the virtual debit account of the sender transaction application.

The one or more computer storage media described above, wherein the computer-executable instructions that, upon execution by a processor, further cause the processor to at least, upon the transaction amount exceeding a balance amount of the virtual debit account of the sender transaction application by a difference amount, cause a load amount greater than or equal to the difference amount to be transferred to the virtual debit account from a source account associated with the virtual wallet of the sender transaction application.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for facilitating transactions between virtual debit accounts associated with corresponding transaction applications. The illustrated one or more processors 619 together with the computer program code stored in memory 622 constitute exemplary processing means for executing transaction applications, interacting over user interfaces and network interfaces, and maintaining virtual debit accounts associated with the transaction applications.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for facilitating a transaction to a recipient computing device, the system comprising:
    at least one processor; and at least one memory comprising computer program code, the at least one memory and computer program code of a sender transaction application configured to, with the at least one processor, cause the at least one processor to:
    receive, by a sender transaction application on a sender computing device, a transaction initiation request, the transaction initiation request including a transaction amount;
    detect a recipient transaction application on the recipient computing device within a proximity of the sender computing device;
    access a sender virtual debit account associated with a virtual wallet of the sender transaction application stored on the sender computing device;
    load funds from a selected account to the sender virtual debit account responsive to a determination that a current balance of the sender virtual debit account is insufficient to cover the transaction amount of the transaction initiation request, wherein the selected account comprises at least one of a credit card account or bank account associated with a user;
    initiate a transfer of the transaction amount from the funds associated with the accessed sender virtual debit account to a corresponding recipient virtual debit account associated with the detected recipient transaction application via short-range wireless communication; and
    upon a confirmation of the transfer being received from the recipient transaction application, provide a record of the transfer to an issuer of the accessed sender virtual debit account.

2. The system of claim 1, wherein detecting the recipient transaction application on the recipient computing device includes:
    detecting a plurality of transaction applications on a plurality of computing devices within the proximity of the sender computing device; and
    selecting the recipient transaction application from the plurality of transaction applications based on selection input received from a user of the sender computing device.

3. The system of claim 1, the at least one memory and computer program code configured to, with the at least one processor, further cause the at least one processor to:
    receive an account load instruction, the account load instruction including a load amount and an account identifier of a source account; and upon receiving the account load instruction, cause, by the sender transaction application, the load amount to be transferred from a source account to the sender virtual debit account of the sender transaction application, wherein the funds corresponding to the load amount are loaded to the sender virtual debit account prior to a transaction facilitated by the sender transaction application or during the transaction facilitated by the transaction application.

4. The system of claim 1, the at least one memory and computer program code configured to, with the at least one processor, further cause the at least one processor to, upon the transaction amount exceeding a balance amount of the sender virtual debit account of the sender transaction application by a difference amount, cause a load amount greater than or equal to the difference amount to be automatically transferred to the sender virtual debit account from a default account associated with the virtual wallet of the sender transaction application.

5. The system of claim 4, wherein causing the load amount to be transferred to the sender virtual debit account from the selected account includes providing a notification that the transaction amount exceeds the balance amount and receiving an account load instruction including the load amount and an account identifier of the selected account, and further comprising:
  update the balance amount of the sender virtual debit account by an issuer of the selected account to reflect an amount of the funds loaded onto the sender virtual debit account once fund loading is complete.

6. The system of claim 1, wherein the at least one memory and computer program code configured to, with the at least one processor, further cause the at least one processor to record the record of the transfer in a transaction data store of the sender transaction application, wherein the transaction data store is configured to store records for a defined time period.

7. The system of claim 1, wherein detecting the recipient transaction application on the recipient computing device includes detecting the recipient computing device based on at least one of a near-field communication (NFC) protocol or a BLUETOOTH protocol.

8. A computerized method for facilitating a transaction to a recipient computing device comprising:
  loading funds, by a sender transaction application on a sender computing device, from a selected account to a sender virtual debit account, wherein the selected account comprises at least one of a credit card account or bank account associated with a user;
  receiving, by the sender transaction application, a transaction initiation request, the transaction initiation request including a transaction amount;
  detecting, by the sender transaction application, a recipient transaction application on the recipient computing device within a proximity of the sender computing device;
  accessing, by the sender transaction application, the sender virtual debit account associated with a virtual wallet of the sender transaction application;
  loading additional funds from the selected account to the sender virtual debit account responsive to a determination that a current balance of the sender virtual debit account is insufficient to cover the transaction amount of the transaction initiation request;
  initiating, by the sender transaction application, a transfer of the transaction amount from the accessed sender virtual debit account to a corresponding recipient virtual debit account associated with the detected recipient transaction application via short-range wireless communication; and
  upon a confirmation of the transfer being received from the recipient transaction application, providing, by the sender transaction application, a record of the transfer to an issuer of the accessed sender virtual debit account.

9. The computerized method of claim 8, wherein detecting the recipient transaction application on the recipient computing device includes:
  detecting a plurality of transaction applications on a plurality of computing devices within the proximity of the sender computing device; and
  selecting the recipient transaction application from the plurality of transaction applications based on selection input received from a user of the sender computing device.

10. The computerized method of claim 8, further comprising:
  receiving, by the sender transaction application, an account load instruction, the account load instruction including a load amount and an account identifier of a source account; and
  upon receiving the account load instruction, causing, by the sender transaction application, the load amount to be transferred from a source account to the sender virtual debit account of the sender transaction application, wherein the funds corresponding to the load amount are loaded to the sender virtual debit account prior to a transaction facilitated by the sender transaction application or during the transaction facilitated by the transaction application.

11. The computerized method of claim 8, further comprising, upon the transaction amount exceeding a balance amount of the sender virtual debit account of the sender transaction application by a difference amount, causing, by the sender transaction application, a load amount greater than or equal to the difference amount to be automatically transferred to the sender virtual debit account from a default account associated with the virtual wallet of the sender transaction application.

12. The computerized method of claim 11, wherein causing the load amount to be transferred to the sender virtual debit account from the selected account includes providing a notification that the transaction amount exceeds the balance amount and receiving an account load instruction including the load amount and an account identifier of the selected account, and further comprising:
  updating the balance amount of the sender virtual debit account by an issuer of the selected account to reflect an amount of the funds loaded onto the sender virtual debit account once fund loading is complete.

13. The computerized method of claim 8, further comprising recording, by the sender transaction application, the record of the transfer in a transaction data store of the sender transaction application, wherein the transaction data store is configured to store records for a defined time period.

14. The computerized method of claim 8, wherein detecting the recipient transaction application on the recipient computing device includes detecting the recipient computing device based on at least one of a near-field communication (NFC) protocol or a BLUETOOTH protocol.

15. The computerized method of claim 8, further comprising authenticating a user of the sender computing device based on at least one of password data or biometric data upon initiation of the transfer of the transaction amount from the accessed sender virtual debit account to the corresponding recipient virtual debit account.

16. The computerized method of claim 8, wherein the sender transaction application is configured for detecting corresponding transaction applications without registering the corresponding transaction applications with the sender transaction application.

17. One or more computer storage media having computer-executable instructions for facilitating a transaction to a recipient computing device that, upon execution by a processor, cause the processor to at least:
   receive, by a sender transaction application on a sender computing device, a transaction initiation request, the transaction initiation request including a transaction amount;
   detect a recipient transaction application on the recipient computing device within a proximity of the sender computing device;
   access a virtual debit account associated with a virtual wallet of the sender transaction application, wherein the accessed virtual debit account is a sender virtual debit account;
   upon the transaction amount exceeding a balance amount of the sender virtual debit account of the sender transaction application by a difference amount, cause a load amount greater than or equal to the difference amount to be automatically transferred to the sender virtual debit account of the sender transaction application from a default account associated with the virtual wallet of the sender transaction application, wherein the default account comprises at least one of a credit card account or bank account associated with a user;
   initiate a transfer of the transaction amount from the accessed virtual debit account to a corresponding virtual debit account associated with the detected recipient transaction application via short-range wireless communication; and
   upon a confirmation of the transfer being received from the recipient transaction application, provide a record of the transfer to an issuer of the accessed virtual debit account.

18. The one or more computer storage media of claim 17, wherein detecting the recipient transaction application on the recipient computing device includes:
   detecting a plurality of transaction applications on a plurality of computing devices with the proximity of the sender computing device; and
   selecting the recipient transaction application from the plurality of transaction applications based on selection input received from a user of the sender computing device.

19. The one or more computer storage media of claim 17, wherein the corresponding virtual debit account is a recipient virtual debit account, wherein the computer-executable instructions that, upon execution by a processor, further cause the processor to at least:
   receive an account load instruction, the account load instruction including the load amount and an account identifier of a source account; and
   upon receiving the account load instruction, cause, by the sender transaction application, the load amount to be transferred from the source account to the sender virtual debit account of the sender transaction application, wherein the funds corresponding to the load amount are loaded to the sender virtual debit account prior to a transaction facilitated by the sender transaction application or during the transaction facilitated by the transaction application.

20. The one or more computer storage media of claim 17, wherein the computer-executable instructions that, upon execution by a processor, further cause the processor to at least, update the balance amount of the sender virtual debit account by an issuer of the selected account to reflect an amount of the funds loaded onto the sender virtual debit account once fund loading is complete.

* * * * *